United States Patent Office 3,475,492
Patented Oct. 28, 1969

---

3,475,492
STABILIZATION OF ACRYLAMIDE
Kazumi Takagi and Tamio Tsunokawa, Niihama-shi, Japan, assignors to Sumitomo Chemical Company, Ltd., Osaka, Japan, a corporation of Japan
No Drawing. Filed July 7, 1967, Ser. No. 651,706
Claims priority, application Japan, July 13, 1966, 41/46,139
Int. Cl. C07c 103/12
U.S. Cl. 260—561          5 Claims

ABSTRACT OF THE DISCLOSURE

A method for inhibiting the polymerization of an acrylamide compound such as acrylamide or methacrylamide by incorporating into said acrylamide compound at least one polymerization inhibitor selected from the group consisting of 2-mercaptoimidazoline, 2-mercaptobenzimidazole and alkali metal salts and ammonium salts of said compounds.

---

This invention relates to a method for stabilizing an acrylamide compound, particularly acrylamide, against its polymerization.

An acrylamide compound, e.g. acrylamide, is prepared, in general, in the manner as shown below.

Acrylonitrile is hydrolyzed with sulfuric acid and water to an acrylamide sulfate. The acrylamide sulfate is neutralized, using water as a medium, with ammonia or a hydroxide or carbonate of alkali metal or alkaline earth metal, or is neutralized with ammonia in an organic solvent such as isopropyl alcohol or methanol. From the neutralized liquid, only the sulfate formed is separated, or mixed crystals of acrylamide and sulfate are separated and the acrylamide is extracted therefrom by use of an organic solvent such as methanol or the like. The thus obtained acrylamide solution is either concentrated or cooled to obtain acrylamide crystals.

Acrylamide itself is very easily polymerizable. Moreover, acrylamide ordinarily contains acrylic acid or ammonium acrylate which are more readily polymerizable than acrylamide and, due to the presence of said compounds, the polymerization of acrylamide is further promoted. It is therefore necessary to apply, during the preparation and storage of acrylamide, a sufficient measure to prevent acrylamide from polymerization. If no such measure has been adopted, great disadvantages are brought about. For example, in the production step, large amounts of polymers are formed to lower not only the purity but also the yield of the product acrylamide. Moreover, gel-like polymers adhere to the interior of the production apparatus to disturb the flow of liquid inside the tubes or to make difficulty the separation of crystals of acrylamide or ammonium sulfate. Further, during the storage of acrylamide obtained as product also, the polymerization thereof gradually progresses unless a polymerization-inhibiting measure has been taken, whereby the acrylamide is deteriorated in quality. In order to overcome such obstacles, there has heretofore been proposed the use of many compounds, including ferrous salt, copper salt, sodium nitrite and the like, as stabilizers against the polymerization of acrylamide compounds. These stabilizers, however, have any of such drawbacks that they are low in polymerization inhibiting ability and therefore, in order to expect effective polymerization inhibition, they are required to be used in considerably large amounts, or that, conversely, they are excessively strong in polymerization inhibiting ability and therefore, in polymerizing or copolymerizing the above-mentioned kind of monomers so as to be put into various uses, they lower the degree of polymerization or color the crystals of said monomers to deteriorate the qualities of the products. Thus, there were very little compounds suitable for use as the stabilizers.

As the result of studies on stabilizers for acrylamide compounds which are satisfactory in every respect, the present inventors have found that a certain kind of heterocyclic compounds are well consistent with the above object and are preferable as stabilizers for the monomers of this kind.

An object of the present invention is to effectively prevent an acrylamide compound from undesirable polymerization. The present invention provides a method characterized in that acrylamide compound is incorporated with at least one compound selected from the group consisting of 2-mercaptoimidazoline, 2-mercaptobenzimidazole and alkali metal salts and ammonium salts of said compounds.

Among the above stabilizers, the former two are represented, respectively, by the following chemical formulas:

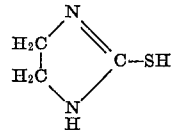   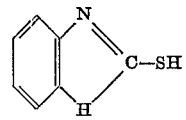

2-Mercaptoimidazoline      2-Mercaptobenzimidazole

In addition to the above compounds, there may be used as the stabilizers of the present invention alkali salts of said compounds, and ammonium salts are also used in addition to sodium and potassium salts.

Of the above stabilizers, particularly preferable are 2-mercaptoimidazoline, and salts thereof.

The stabilizers of the present invention are useful as stabilizers for acrylamide compounds such as acrylamide and methacrylamide. They effectively display their ability of inhibiting the polymerization of acrylamide compounds in every mode of from the preparation to storage thereof. For example, these stabilizers can be used to sufficiently inhibit the polymerization of acrylamide, during the preparation thereof, even under such severe acrylamide-treating conditions as encountered in the neutralization, extraction, concentration, separation, circulation or drying steps in which acrylamide is treated in the form of an aqueous solution, organic solvent solution, slurry or crystal. Further, the stabilizers are usable also in storing acrylamide in the form of crystals or of an aqueous or alcohol solution, whereby the polymerization of said compound is inhibited to make possible the storage thereof for a long period of time.

In case the present stabilizers are to be used at the time of preparation of acrylamide, it is desirable to use them particularly in either the step of neutralizing acrylamide during said steps is prevented but acrylamide crysthe step of extracting acrylamide with methanol from the mixed crystals of acrylamide and ammonium sulfate which have been obtained from the solution after said neutralization, or the step of concentrating the resulting extract. Alternatively, the stabilizers of the present invention may be used in the step of crystallizing acrylamide from its solution or in the step of drying the resulting crystals, whereby not only the polymerization of acrylamide during said steps is prevented but acrylamide crystals containing the stabilizers can be obtained.

The present stabilizers are usable, as well, in preparing methacrylamide from methacrylonitrile or in storing the methacrylamide.

The amount of the stabilizer to be added is preferably in the range of 0.001–1.0% by weight based on the weight of the acrylamide compound, in general. Of course, the amount varies depending on the environmental conditions of the compound. For example, for the polymerization inhibition of acrylamide compound crystals the amount of stabilizer is selected from the range of 0.001 to 0.05% by weight so as to be suitable for a required polymerization inhibition period. On the other hand, under severe conditions adopted in the preparation of acrylamide compound, the amount is preferably in the range of 0.01–1.0% by weight.

The stabilizers in accordance with the present invention may be used either independently or in admixture. The stabilizers may also be used in combination with other stabilizers proposed heretofore. For example, in the neutralization of a sulfate of acrylamide compound, the present stabilizer may be used in combination with a copper salt or ferrous salt to enhance the polymerization prevention effects. Alternatively, in the step in which an acrylamide compound-containing solution is concentrated and the resulting crystals are separated and dried, the present stabilizer may be used in combination with nitrosobenzene, which has already been found by the present inventors to be an effective stabilizer, thereby effecting the drying treatment in the presence of large amounts of stabilizers. On the other hand, the escapability of the nitrosobenzene is utilized in the above case, so that not much amount of the stabilizers remains in the crystals after drying, whereby the amount of stabilizers left in the crystals can be suitably controlled. In the above cases also, the amount of individual stabilizers employed is in the range of 0.001–1.0% by weight based on the acrylamide compound.

Advantages attained by use of the present stabilizers will be detailed below.

The first advantage is that the present stabilizers have high polymerization inhibition effects on acrylamide compounds during preparation and storage. The extraction, concentration, crystallization or drying step at the time of preparation of acrylamide compounds is carried out, in most cases, under reduced pressure. In such cases, the amount of oxygen becomes smaller and therefore the acrylamide compounds are brought into a readily polymerizable state (oxygen acts as a polymerization inhibitor). However, in case the present stabilizers are made present, the formation of polymers is sufficiently inhibited to make it possible to obtain products susbtantially free from water insolubles and methanol insolubles (all of these are polymers). Further, the present stabilizers are also high in effect of stabilizing acrylamide compounds during storage, and if the present stabilizers have been incorporated, acrylamide compounds show no substantial increase in water and methanol insoluble content even when heated at 70° C. for one week.

The second advantage is that in polymerizing or copolymerizing acrylamide compounds so as to apply the resulting polymers to various uses such as fiber-processing agents, paper strength-reinforcing agent, precipitating agents or paints, the present stabilizers scarcely give detrimental effects on the degree of polymerization or conversion of acrylamide compounds to its polymer. Therefore, the present stabilizers are not required to be removed, before polymerization, from acrylamide compounds.

The third advantage is that the present stabilizers do not color acrylamide compounds. That is, the present stabilizers do not become a cause for coloration of acrylamide compounds not only in the cases where crystals or solutions of said compounds are stored but also in the extraction, concentration, crystallization or drying step adopted in the preparation of acrylamide compounds.

The following examples illustrate the present invention, but it should be construed that the present invention is not limited thereto.

EXAMPLE 1

Purified acrylamide was incorporated with 1000 p.p.m. of each of the stabilizers (polymerization inhibitors) shown in Table 1 and was melted at 98°–100° C. to measure a turbidity occurrence time at which the polymerization of said acrylamide initiated. The results were as set forth in Table 1.

Table 1

| Stabilizer: | Turbidity occurrence time (min.) |
|---|---|
| Not incorporated | 22 |
| Ferrous sulfate | 25 |
| Cupric sulfate | 33 |
| Sodium nitrite | 4 |
| 2-mercaptoimidazoline | >320 |
| Sodium salt thereof | 300 |
| 2-mercaptobenzimidazole | >180 |

The present stabilizers had the same stabilization effects on methacrylamide, as well.

EXAMPLE 2

Acrylonitrile was hydrolyzed with sulfuric acid and water to form an acrylamide sulfate, which was then neutralized with ammonia using water as a medium. From the neutralization product, the crystal of ammonium sulfate was filtered off and the filtrate was cooled to crystallize acrylamide. The resulting crude acrylamide was separated and dissolved in methanol to a 50% solution. After incorporation of 200 p.p.m. based on the acrylamide of each of the stabilizers shown in Table 2, the solution was heated at 50° C. under a reduced pressure of 200 mm. Hg to measure a turbidity occurrence time at which the polymerization of said acrylamide initiated. The results were as set forth in Table 2.

Table 2

| Stabilizer: | Turbidity occurrence time (min.) |
|---|---|
| Not incorporated | 18 |
| Ferrous sulfate | 15 |
| Sodium nitrite | 26 |
| 2-mercaptoimidazoline | 64 |
| Ammonium salt thereof | 60 |
| 2-mercaptobenzimidazole | 70 |
| Potassium salt thereof | 62 |

EXAMPLE 3

Acrylonitrile was hydrolyzed with sulfuric acid and water to form an acrylamide sulfate, which was then neutralized with ammonia. The resulting mixed crystals of acrylamide and ammonium sulfate were extracted with methanol to a 42% solution of acrylamide. The solution was incorporated with 200 p.p.m. based on the acrylamide of each of the stabilizers shown in Table 3 and was concentrated until the acrylamide concentration became 65%. After cooling and crystallizing the concentrated solution, acrylamide was separated and was dried at 50° C. under 200 mm. Hg. The resulting crystals were charged in a thermostat at 70° C. and the variation with time of the crystals in purity, water insoluble content, methanol insoluble content and colored degree (APHA of a 10% aqueous acrylamide solution) was measured. The results were as set forth in Table 3.

APHA is a value colorimetrically determined according to the method described in ASTM D1209-62, using as a standard the color of an aqueous solution of $$K_2PtCl_6\text{—}CoCl_2 \cdot 6H_2O$$

TABLE 3

| Stabilizer | Lapsed days | Purity, percent | Water-insoluble content, percent | Methanol-insoluble content, percent | APHA of 10% aqueous solution |
|---|---|---|---|---|---|
| Not incorporated | 0 | 98.6 | 0.010 | 0.081 | 5-10 |
|  | 2 | 98.2 | 0.128 | 0.275 | 10-15 |
|  | 4 | 97.5 | 0.214 | 1.110 | 15-20 |
|  | 6 | 96.1 | 0.261 | 1.930 | 25-30 |
| 2-mercaptoimidazoline | 0 | 99.2 | 0.003 | 0.007 | 0-5 |
|  | 2 | 99.0 | 0.005 | 0.010 | 0-5 |
|  | 4 | 98.8 | 0.006 | 0.016 | 5 |
|  | 6 | 98.8 | 0.009 | 0.018 | 5-10 |
| 2-mercaptobenzimidazole | 0 | 99.2 | 0.006 | 0.012 | 0-5 |
|  | 2 | 99.1 | 0.009 | 0.020 | 5 |
|  | 4 | 98.8 | 0.013 | 0.028 | 5-10 |
|  | 6 | 98.6 | 0.015 | 0.036 | 5-10 |

EXAMPLE 4

Acrylonitrile was hydrolyzed with sulfuric acid and water to form an acrylamide sulfate, which was then neutralized with ammonia. The resulting mixed crystals of acrylamide and ammonium sulfate were extracted with methanol to a 40% solution of acrylamide. The solution was incorporated with 200 p.p.m. and 50 p.p.m. based on the acrylamide of nitrosobenzene and 2-mercaptoimidazoline, respectively, and was concentrated at 50° C. under reduced pressure until the concentration of acrylamide became 65%. After cooling and crystallizing the concentrated liquid, acrylamide was separated and was dried at 50° C. under 200 mm. Hg. The above procedures were repeated using, nitrosobenzene in combination with 2-mercaptobenzimidazole.

All the resulting acrylamide crystals were completely dissolved in water and methanol and the presence of substances insoluble in said solvents (i.e. polymers) was not observed at all.

Further, the acrylamide crystals were melted at 98°–100° C. to measure respective turbidity occurrence times at which the polymerization initiated. The results were such that in the case of acrylamide crystals obtained by use of 200 p.p.m. of only nitrosobenzene, the turbidity occurrence time was 25 minutes, whereas in the case of the crystals obtained by use of nitrosobenzene plus 2-mercaptobenzothiazole and nitrosobenzene plus 2-mercaptobenzimidazole, the turbidity occurrence times were 150, and 120 minutes, respectively.

EXAMPLE 5

50 g. of purified acrylamide was incorporated with 30 p.p.m. based on the acrylamide of each of the stabilizers shown in Table 4, and was dissolved in water to form a 10% aqueous acrylamide solution. To the solution were added 0.10 g. of potassium persulfate and 6.2 g. of isopropyl alcohol, and the mixture was polymerized at 70° C. for 90 minutes. The viscosities of the thus obtained liquids after polymerization were measured by means of a Brookfield viscosimeter. The results were as set forth in Table 4.

TABLE 4

| Stabilizer | Viscosity (poises at 25° C.) | Conversion, percent |
|---|---|---|
| Not incorporated | 192 | 96.2 |
| Ferrous sulfate | 124 | 81.3 |
| 2-mercaptoimidazoline | 187 | 96.6 |
| 2-mercaptobenzimidazole | 191 | 95.9 |

EXAMPLE 6

A 3% aqueous acrylamide solution was incorporated with 1% based on the acrylamide of potassium persulfate and 1% based on the potassium persulfate of ferrous sulfate, and the liquid was subjected to redox polymerization. After polymerizing at 50° C. for 2 hours, the liquid was cooled to 25° C. and was subjected to viscosity measurement using a Brookfield viscometer. The solution viscosity of recrystallized acrylamide not incorporated with stabilizer was 17.2 poises, whereas the solution viscosities, after polymerization, of acrylamide incorporated with 10 p.p.m. and 30 p.p.m. based on the acrylamide of 2-mercaptoimidazoline were 16.6 and 15.2 poises, respectively. Further, the colored degree of the stabilizer-incorporated acrylamide liquid after polymerization was 0–5 when represented by APHA in which not only no coloration due to incorporation of 2-mercaptoimidazoline was observed but also the lowering in viscosity was slight. The solution viscosity, after polymerization, of acrylamide incorporated with 30 p.p.m., based on the acrylamide incorporated with a known stabilizer, e.g. t-butyl-p-no tendency of coloration was observed therein.

The solution viscosity, after polymerization, of acrylamide incorporated with a known stabilizer, e.g. t-butyl-p-hydroxyanisole, was 5.4 poises.

EXAMPLE 7

Redox polymerization was effected using potassium persulfate-sodium thiosulfate. In polymerizing a 10% aqueous acrylamide solution at 50° C. for 60 minutes, the use of purified acrylamide resulted in such values as a solution viscosity of 246 poises, a conversion of 98.2% and a molecular weight of 625,000. On the other hand, the use of acrylamide incorporated with 20 p.p.m. based on the acrylamide of 2-mercaptoimidazoline resulted in such values as a solution viscosity of 231 poises, a conversion of 98.4% and a molecular weight of 611,000, and there was observed no tendency to disturb the polymerizability of the acrylamide.

We claim:
1. A method for stabilizing an acrylamide compound selected from the group consisting of acrylamide and methacrylamide, characterized in that the acrylamide compound is incorporated with at least one polymerization inhibitor selected from the group consisting of 2-mercaptoimidazoline, 2-mercaptobenzimidazole and alkali metal salts and ammonium salts of said compounds.

2. A method according to claim 1, wherein the polymerization inhibitor is incorporated in an amount in the range of 0.001 to 1.0% by weight based on the acrylamide compound.

3. A method of inhibiting the polymerization of acrylamide during the concentration of an acrylamide-containing solution and the separation, drying and storage of the resulting acrylamide, which comprises incorporating in an acrylamide-containing solution 0.001–1.0% by weight based on the acrylamide of at least one polymerization inhibitor selected from the group consisting of 2-mercaptoimidazoline, 2-mercaptobenzimidazole and alkali metal salts and ammonium salts of said compounds concentrating said solution and separating, drying and storing the resulting acrylamide.

4. A method of inhibiting the polymerization of acrylamide during the concentration of an acrylamide-containing solution and the separation, drying and storage of the resulting acrylamide which comprises incorporating in an acrylamide-containing solution 0.001–1.0% by weight based on the acrylamide of at least one polymerization inhibitor selected from the group consisting of 2-mercaptoimidazoline, 2-mercaptobenzimidazole and alkali metal salts and ammonium salts of said compounds and 0.001–1.0% by weight based on the acrylamide of nitrosobenzene, concentrating said solution, and separating, drying and storing the resulting acrylamide.

5. Acrylamide containing 0.001–1.0% by weight of the acrylamide of at least one polymerization inhibitor selected from the group consisting of 2-mercaptoimidazoline, 2-mercaptobenzimidazole and alkali metal salts and ammonium salts of said compounds.

References Cited

Kluchesky et al., Ind. and Eng. Chem., vol. 41, No. 8, pp. 1768–71 (1949).

Newman, Chem. Abs., vol. 55:16421 h, abstracts of British Patent No. 863,718 (March 1961).

ALEX MAZEL, Primary Examiner

J. A. NARCAVAGE, Assistant Examiner

U.S. Cl. X.R.

252—402